(12) United States Patent
Lin

(10) Patent No.: US 8,035,316 B2
(45) Date of Patent: Oct. 11, 2011

(54) CURRENT-LIMITING PROTECTION CIRCUIT OF A REMOTELY CONTROLLED CEILING FAN-LAMP

(76) Inventor: Ming-Hui Lin, Taichung (TW)

( * ) Notice: Subject to any disclaimer, the term of this patent is extended or adjusted under 35 U.S.C. 154(b) by 605 days.

(21) Appl. No.: 12/170,929

(22) Filed: Jul. 10, 2008

(65) Prior Publication Data

US 2010/0007291 A1    Jan. 14, 2010

(51) Int. Cl.
*H05F 1/00* (2006.01)
*H05B 37/02* (2006.01)
*H05B 39/04* (2006.01)
*H05B 41/36* (2006.01)

(52) U.S. Cl. ......... 315/302; 315/307; 315/310; 315/311

(58) Field of Classification Search .................. 315/302, 315/307, 310, 311
See application file for complete search history.

(56) References Cited

U.S. PATENT DOCUMENTS

| | | | | | |
|---|---|---|---|---|---|
| 4,032,817 | A | * | 6/1977 | Richmond | 315/149 |
| 4,560,909 | A | * | 12/1985 | Peil | 315/291 |
| 4,621,992 | A | * | 11/1986 | Angott | 417/572 |
| 4,716,409 | A | * | 12/1987 | Hart et al. | 340/825.22 |
| 4,823,069 | A | * | 4/1989 | Callahan et al. | 323/235 |

* cited by examiner

*Primary Examiner* — Jacob Y Choi
*Assistant Examiner* — Henry Luong
(74) *Attorney, Agent, or Firm* — Ming Chow; Sinorica, LLC

(57) ABSTRACT

A current-limiting protection circuit of remotely controlled ceiling fan-lamp is disclosed. The current-limiting protection circuit includes a microcontroller unit for detecting rectangular wave signal reflective of the power used by a lamp load. The rectangular wave signal is compared with nominal value. In the case that the positive bandwidth of the rectangular wave signal is larger than the nominal value, it is indicated that the lamp load is in an overloaded state. Under such circumstance, the microcontroller unit controls a lamp load driving unit to change driving manner and lower the power used by the lamp load to a value within the nominal range.

2 Claims, 1 Drawing Sheet

CURRENT-LIMITING PROTECTION CIRCUIT OF A REMOTELY CONTROLLED CEILING FAN-LAMP

BACKGROUND OF THE INVENTION

The present invention is related to an overload protection technique of a remotely controlled electric appliance, and more particularly to a current-limiting protection circuit of a remotely controlled ceiling fan-lamp.

In use of a conventional ceiling fan-lamp, a user can hardly know and control the power consumed by the ceiling fan-lamp. In the case that the power used by the lamp exceeds a safety or nominal limit, the lamp is in an overloaded state and likely to burn out. On the other hand, the excessive power used by the lamp leads to waste of energy and fails to meet the requirements of environment protection.

SUMMARY OF THE INVENTION

It is therefore a primary object of the present invention to provide a current-limiting protection circuit of remotely controlled ceiling fan-lamp. The current-limiting protection circuit is able to automatically detect and adjust the power used by a lamp to limit the power within a nominal range. Accordingly, the lamp is protected from burning out and the energy can be more efficiently utilized.

According to the above object, the current-limiting protection circuit of remotely controlled ceiling fan-lamp of the present invention includes a microcontroller unit for detecting rectangular wave signal reflective of the power used by a lamp load. The rectangular wave signal is compared with nominal value. In the case that the positive bandwidth of the rectangular wave signal is larger than the nominal value, it is indicated that the lamp load is in an overloaded state. Under such circumstance, the microcontroller unit controls a lamp load driving unit to change driving manner and lower the power used by the lamp load to a value within the nominal range.

The present invention can be best understood through the following description and accompanying drawings wherein:

DETAILED DESCRIPTION OF THE PREFERRED EMBODIMENTS

Figure 1:
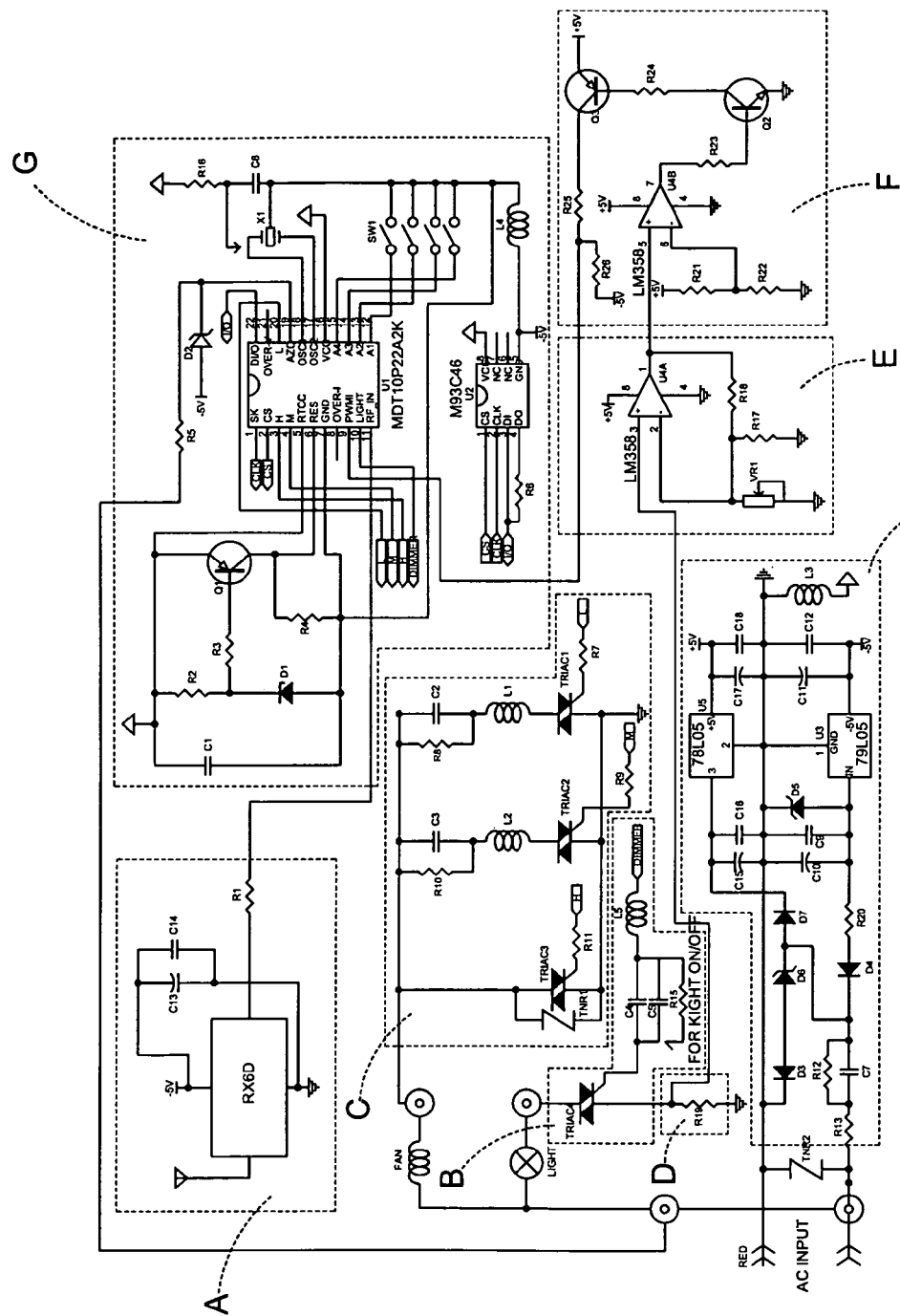
FIG. 1 is a circuit diagram of a preferred embodiment of the current-limiting protection circuit of the remotely controlled ceiling fan-lamp of the present invention.

Please refer to FIG. 1, which is a circuit diagram of a preferred embodiment of the current-limiting protection circuit of the remotely controlled ceiling fan-lamp of the present invention. The current-limiting protection circuit includes a remote control signal demodulation unit, a lamp load driving unit, a ceiling fan load driving unit, a sampling unit, a signal amplifier unit, a comparison unit, a controlling unit and a power supply unit.

The remote control signal demodulation unit A serves to receive control signals transmitted from a remote control transmitter and demodulate the control signals.

The lamp load driving unit B serves to drive a lamp to work.

The ceiling fan load driving unit C serves to drive a ceiling fan to work.

The sampling unit D includes a sampling resistor R19. A first terminal of the sampling resistor R19 is connected to the lamp via the lamp load driving unit A, while a second terminal thereof is grounded. The sampling unit D serves to pick up sampled voltage signals reflective of the power used by the lamp.

The signal amplifier unit E includes an amplifying control chip U4A. An in-phase input terminal of the amplifying control chip U4A is connected to the sampling resistor R19. An eighteenth resistor R18 is connected between an output terminal OUT1 of the amplifying control chip U4A and an inverted input terminal thereof. A variable impedor VR1 and a seventeenth resistor R17 are connected to the inverted input terminal of the amplifying control chip U4A, which is grounded.

The comparison unit F includes a comparison chip U4B. A non-inverted input terminal of the comparison chip U4B is connected to the output terminal OUT1 of the amplifying control chip U4A. An inverted input terminal of the comparison chip U4B is connected to a 5-volt power supply via a twentieth resistor R21 and grounded via a twenty-second resistor R22.

The controlling unit G includes a microcontroller unit U1. A current-limiting signal input terminal PWMI is positioned on a pin 9 of the microcontroller unit U1 and connected to an output terminal OUT2 of the comparison chip U4B. A remote control signal input terminal RF_IN is positioned on a pin 11 of the microcontroller unit U1 and connected to an output terminal of the remote control signal demodulation unit A. A lamp load control signal output terminal DIMMER is positioned on a pin 10 of the microcontroller unit U1 and connected to the lamp load driving unit B. A low speed, a middle speed and a high speed fan load control signal output terminals L, M, H are respectively positioned on pins 20, 4, 3 of the microcontroller unit U1 and connected to the fan load driving unit C.

The power supply unit H serves to supply power for the above units.

In the above current-limiting protection circuit of the remotely controlled ceiling fan-lamp, the sampling unit D samples a sampled voltage signal from the lamp load circuit reflective of the lamp load power. The weak sampled signal is transmitted to the signal amplifier unit E via the in-phase input terminal of the amplifying control chip U4A. The amplifying control chip U4A amplifies the sampled signal and transmits the amplified sampled signal to the comparison unit F via the in-phase input terminal of the comparison chip U4B. The comparison unit F compares the amplified sampled signal with a standard potential preset in the comparison unit F. In the case that the potential of the sampled signal is lower than the standard potential, the comparison unit F will not output any signal. In the case that the potential of the sampled signal is higher than the standard potential, the comparison unit F converts sine waves of the amplified sampled signal into rectangular waves and outputs the signal to the controlling unit G.

The controlling unit G serves to detect the positive bandwidth of the rectangular wave signal. The positive bandwidth is varied with the magnitude of the power used by the lamp load. In the case that the detected positive bandwidth is not larger than a preset nominal value, the controlling unit G will not output any adjustment control signal to the lamp load driving unit B. On the other hand, in the case that the detected positive bandwidth is larger than the nominal value, the controlling unit G outputs a control signal via a lamp load control signal terminal DIMMER, whereby the conduction phase angle of a triac TRIAC4 of the lamp load driving unit B is adjusted in response to the control signal. Under such circumstance, the power used by the lamp load descends to a value not higher than the nominal value. Accordingly, the current-limiting protection circuit of the remotely controlled ceiling fan-lamp is able to effectively protect the lamp and avoid waste of energy due to overdrive.

The above embodiments are only used to illustrate the present invention, not intended to limit the scope thereof. Many modifications of the above embodiments can be made without departing from the spirit of the present invention.

What is claimed is:

1. A current-limiting protection circuit of remotely controlled ceiling fan-lamp, comprising:
    a remote control signal demodulation unit for receiving control signals and demodulating the control signals;
    a lamp load driving unit for driving a lamp load to work, the lamp load driving unit including a triac;
    a fan load driving unit for driving a fan load to work;
    a sampling unit including a sampling resistor, a first terminal of the sampling resistor being connected to the lamp load via the lamp load driving unit, while a second terminal of the sampling resistor being grounded, the sampling unit serving to pick up sampled voltage signals reflective of the power used by the lamp load;
    a signal amplifier unit including an amplifying control chip, an in-phase input terminal of the amplifying control chip being connected to the sampling resistor for amplifying the sampled voltage signal;
    a comparison unit including a comparison control chip, an in-phase input terminal of the comparison control chip being connected to an output terminal of the amplifying control chip for converting a sine wave amplified sampled signal into a rectangular wave signal; and
    a controlling unit including a microcontroller unit, a current-limiting signal input terminal being connected between the microcontroller unit and an output terminal of the comparison control chip, whereby the rectangular wave signal can be transmitted to the microcontroller unit, a lamp load control signal output terminal being connected between the microcontroller unit and the lamp load driving unit for outputting control signal to control the lamp load driving unit, whereby in the case the microcontroller unit detects that the positive bandwidth of the received rectangular wave signal is larger than a preset nominal value, the microcontroller unit outputs a control signal to change the conduction phase angle of the triac of the lamp load driving unit and lower the power used by the lamp load to a value not higher than the nominal value.

2. The current-limiting protection circuit of remotely controlled ceiling fan-lamp as claimed in claim 1, wherein the controlling unit further includes a remote control signal input terminal connected between the microcontroller unit and an output terminal of the remote control signal demodulation unit, whereby via the lamp load driving unit and the fan load driving unit, the microcontroller unit can control the operation of the lamp load and the fan load in response to the remote control signal.

* * * * *